United States Patent [15] 3,689,548
Maier [45] Sept. 5, 1972

[54] PROCESS FOR PREPARING ORGANIC PHOSPHINIC ACID ANHYDRIDES

[72] Inventor: Ludwig Maier, Zurich, Switzerland
[73] Assignee: Monsanto Company, St. Louis, Mo.
[22] Filed: Feb. 14, 1969
[21] Appl. No.: 799,515

[52] U.S. Cl. ............... 260/545 P, 252/8.1, 260/543 P
[51] Int. Cl. .................................................. G07f 9/28
[58] Field of Search .................................. 260/545 P

[56] References Cited
UNITED STATES PATENTS
2,566,194 8/1951 Hagemeyer et al. ........ 260/461
2,632,768 3/1953 Loover et al. ............. 260/461

*Primary Examiner*—Lorraine A. Weinberger
*Assistant Examiner*—Robert Gerstl
*Attorney*—John D. Upham, Joseph D. Kennedy, L. Burce Stevens, Jr. and Herman O. Bauermeister

[57] ABSTRACT

A process for preparing organic phosphinic acid anhydrides of the formula $R^1R^2P(O)OP(O)R^1R^2$ by reacting an organic phosphinic acid of the formula $R^3R^4P(O)OH$ with thionyl chloride, e.g., reacting bis-(hydroxymethyl)-phosphinic acid with thionyl chloride.

1 Claim, No Drawings

PROCESS FOR PREPARING ORGANIC PHOSPHINIC ACID ANHYDRIDES

The present invention relates to a process for preparing organic phosphinic acid anhydrides of the general formula

in which $R^1$ and $R^2$ are identical or different, possibly halogenated hydrocarbon groups and taken together with their phosphorus atom a heterocyclic group.

The instant process in particular relates to the preparation of bis-(chloromethyl)-phosphinic acid anhydride of the formula

Bis-(chloromethyl)-phosphinic acid anhydride has been prepared from bis-(chloromethyl)-phosphinic acid chloride and formaldehyde [K. Moedritzer, JACS83, 4381 (1961)]. It has further been known that the reaction of bis-(hyrdoxymethyl)-phosphinic acid with thionyl chloride leads to bis-(chloromethyl)-phosphinic acid chloride [A. W. Frank and I. Gordon, Canad. J. Chem.44, 2593 (1966)].

Now it has been found that when diorganophosphinic acid or cycloorganophosphinic acid of the general formula

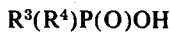

in which $R^3$ and $R^4$ have the same significance as $R^1$ and $R^2$ and may also have attached hydroxyl groups, is reacted with $SOCl_2$, the corresponding organic phosphinic acid anhydride is obtained, provided that this reaction is carried out using a stoichiometric or excess quantity of thionyl chloride at room temperature at maximum or using a stoichiometric quantity of thionyl chloride at a temperature of about 80°C at maximum.

When the reaction mixture containing excess thionyl chloride is reacted at a higher temperature, e.g., about 30° to 80°C, the corresponding phosphinic acid chloride is formed. It is surprising that at room temperature or lower temperatures an acid anhydride is obtainable even using excess thionyl chloride, since it had been generally known that the reaction of organic acids with thionyl chloride leads to the corresponding acid chlorides.

The reaction of invention proceeds with, for example, bis-(hydroxymethyl)-phosphinic acid according to the equation:

$$2(HOCH_2)_2P(O)OH + 5\ SOCl_2$$

$$(ClCH_2)_2P(O)O(O)P(CH_2Cl)_2 + 5SO_2 + 6HCl$$

Suitable organic phosphinic acids are dialkyl phosphinic acids such as dimethyl, diethyl, dipropyl, diisopropyl, dioctyl and didodecyl phosphinic acid; dicycloalkyl phosphinic acids such as dicyclopentyl, dicyclohexyl and dicyclooctylphosphinic acid; diaralkyl phosphinic acids such as dibenzyl and diphenylbutyl phosphinic acid; diaryl phosphinic acids such as diphenyl, di-α-naphthyl and di-β-naphthyl phosphinic acid; dialkaryl phosphinic acids such as ditolyl, di-p-xylyl, di-m-xylyl, di-o-xylyl and didodecylphenyl acid; 1-hydroxy1-oxo-phosphacycloalkanes such as 1-hydroxy-1-oxo-phosphacyclopentane, 1-hydroxy-1-oxo-phosphacyclohexane 1-hydroxy-1-oxo-phosphacyclooctane. In the last mentioned compounds $R^3$ and $R^4$ of the formula set forth above taken together with their phosphorus atom form a heterocyclic group.

The groups $R^3$ and $R^4$ can be different and consequently represent a combination of the organic groups cited above. Besides halogen atoms also hydroxyl groups can occur as substituents in the starting compounds. These will be replaced by chlorine atoms in the reaction.

The organic phosphinic acid anhydrides are reactive intermediates. They can be converted to the corresponding esters, amides and salts in a manner known for acid anhydrides. Cleavage to the corresponding phosphinic acid chlorides takes place on heating with excess quantity of thionyl chloride. Moreover, the organic phosphinic acid anhydrides are useful for making flameproof combustible materials.

EXAMPLE 1

To 1,335 g(11.2 moles) of thionyl chloride there are added in the course of 6 hours 472 g(3.45 moles) of bis-(hydroxymethyl)-phosphinic acid. The reactions is exothermic and HCl and $SO_2$ are evolved. After stirring at room temperature for an additional 3 hours the reaction mixture is distilled. Yield 529.1 g(92%) $(ClCH_2)_2P(O)O(O)P(CH_2Cl)_2$; b.p. 185°C/0.1 mm, m.p. 67°72° C.

EXAMPLE 2

To 133.5 g(1.12 moles) of boiling thionyl chloride (about 80°C) there are added slowly 47.2 g(0.374 mole) of bis-hydroxymethyl)-phosphinic acid. (The starting compound contains 3.6 percent hydroxymethyl-phosphonic acid). After heating for 5 hours at about 80°C the reaction mixture is distilled. Yield 44.2 g(77%) $(ClCH_2)_2P(O)O(O)P(CH_2Cl)_2$; b.p. 176°–182 °C/0.01mm, m.p. 68°–73°C.

EXAMPLE 3

To 218 g(1.835 moles) of thionyl chloride there are added at 0° to 20°C in the course of 5 hours 46.2 g(0.367 mole) of $(HOCH_2)_2P(O)OH$. After stirring at room temperature for an additional 3 hours the reaction mixture is distilled. Besides $SOCl_2$ there is obtained a small forerun of $(ClCH_2)_2P(O)Cl$ byproduct.
Yield 35.0 g(62%) of bis-(chloromethyl-phosphinic acid anhydride having the same properties as the endproduct of Example 2.

EXAMPLE 4

The bis-(chloromethyl)-phosphinic acid anhydride is cleaved to the corresponding acid chloride in the following manner:
4.4 g(0.0144 mole) of anhydride and 20 g(0.168 mole) of $SOCl_2$ are heated at 80°C. (At room temperature the cleavage proceeds very slowly). $SO_2$ is continuously evolved. The reaction mixture is distilled after 2 hours. Besides the excess of $SOCl_2$ there is obtained quantitatively $(ClCH_2)_2P(O)Cl$; b.p. 103°–105°C/6 mm.

What I claim is:
1. A process for preparing bis-(chloroalkyl) phosphinic acid anhydride of the formula

$R^1(R^2)POP(R^1)R^2$
$\quad\ \ \| \ \ \ \|$
$\quad\ \ O\ \ \ O$ wherein $R^1$ and $R^2$ are chloroalkyl groups which consists essentially of reacting an organic phosphinic acid of the formula $R^3(R^4)POH$
$\quad\quad\ \|$
$\quad\quad\ O$ in which $R^3$ and $R^4$ are hydroxyalkyl groups with a stoichiometric quantity of thionyl chloride at a temperature in the range of from about room temperature to about 80°C.

* * * * *